Nov. 27, 1956  J. O. KIRWAN  2,771,772
APPARATUS FOR MEASURING THE MASS RATE OF FLOW
Filed April 13, 1953  3 Sheets-Sheet 1

INVENTOR.
John O. Kirwan
BY
Robert A. Dunham
ATTORNEY

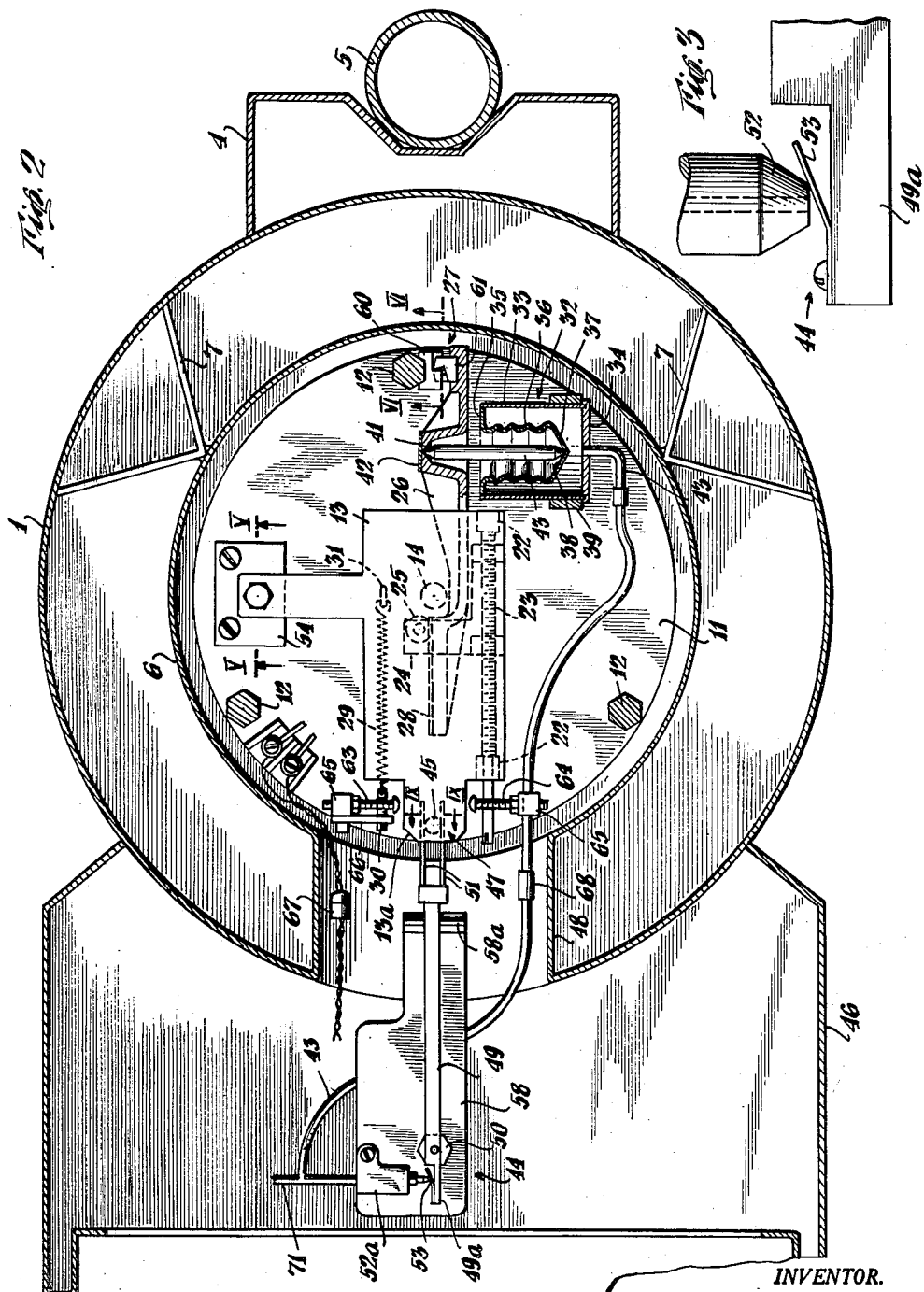

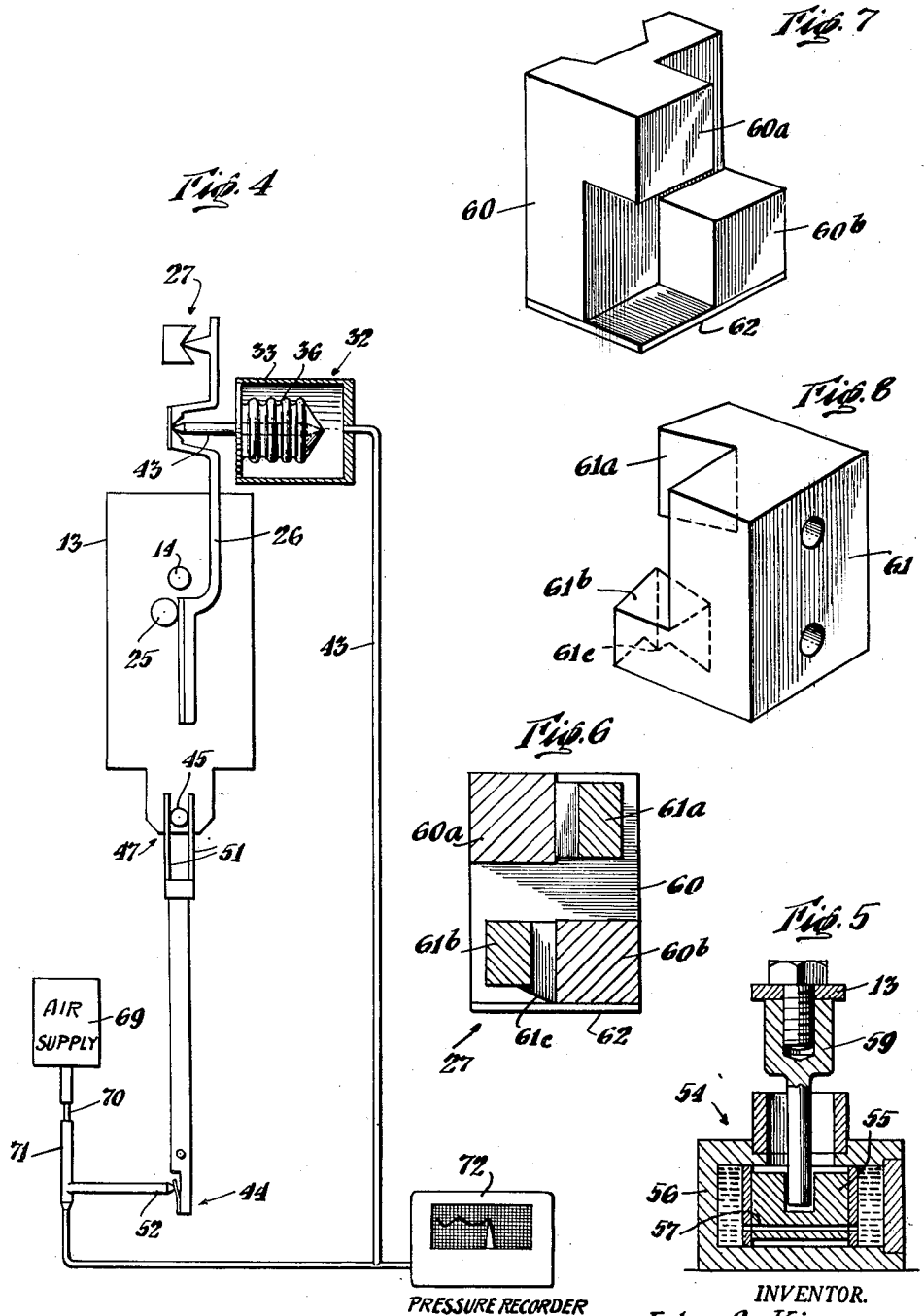

United States Patent Office 2,771,772
Patented Nov. 27, 1956

2,771,772

APPARATUS FOR MEASURING THE MASS RATE OF FLOW

John O. Kirwan, Livingston, N. J., assignor to Wallace & Tiernan Incorporated, a corporation of Delaware Application April 13, 1953, Serial No. 348,148

11 Claims. (Cl. 73—194)

This invention relates to apparatus for measuring the mass rate of flow of fluent material. The fluent material concerned in the particular apparatus shown and described herein is granular material. The term "fluent material" as used herein, is intended to include divided solids, liquids, and semi-liquid or like substances having free-flowing characteristics, but not gases or vapors. Apparatus according to the invention may be applied to all such fluent materials.

The apparatus of the present invention carries out the method of measurement of the mass rate of flow of fluent material, which is described and claimed in the copending application of Charles F. Wallace, Serial No. 287,137, filed May 10, 1952, and entitled "Measurement of Fluent Material." The apparatus disclosed herein is intended as an improvement on the apparatus, of the Wallace application.

In the Wallace application, there is shown an impeller rotating about a vertical axis in a confined space. The material, whose rate of flow is to be measured, is directed downwardly towards the center of the impeller and is accelerated horizontally thereby to the periphery of the impeller. This acceleration of the material imposes a torque load on the impeller, which varies as a function of the mass rate of flow of the fluent material. The impeller and its inlet and outlet passages are not filled completely with the fluent material, but considerable air space is provided above the material, even at maximum flow. Consequently, there is no torque load on the impeller due to the pressure of the fluent material being measured, and the only torque load is that required to accelerate the material from the center of the impeller to its periphery. The impeller is driven by an electric motor mounted on a fixed frame located outside the conduit system for the fluent material. This motor is connected to the impeller through a gear train which includes a torque measuring coupling. This coupling actuates a valve to control the pressure in a pneumatic system, which pressure is recorded by a suitable pressure recording instrument. This pressure is a measure of the torque load on the impeller and hence is a measure of the mass rate of flow of fluent material through the apparatus. By suitable calibration, the recording instrument may be made to read in terms of the mass rate of flow of the fluent material.

An object of the present invention is to provide improved apparatus of the type described, which is more compact and requires less space than the previous apparatus. A further object is to provide such apparatus in which all the mechanism for driving the propeller is enclosed within a dustproof housing.

Another object is to provide improved apparatus of the type described in which the principal parts of the measuring mechanism are readily accessible for inspection, repair and adjustment. A further object is to provide apparatus of the type described in which all the necessary adjustments may be made quickly and conveniently.

Another object is to provide an apparatus of the type described which may be assembled quickly and easily, and in which the measuring mechanism is substantially free from friction losses.

Another object of the invention is to provide an improved releasable mechanical coupling for use in apparatus of the type described.

Another object is to provide an improved valve for controlling a pneumatic pressure in response to a variable condition.

Another object is to provide an improved frictionless pivot mechanism.

The foregoing and other objects of the invention are attained by providing a generally cylindrical housing adapted for insertion in a vertical conduit through which the material to be measured is flowing downwardly. Within this housing is located a concentric casing enclosing the principal impeller driving parts of the apparatus. The impeller and its driving mechanism are mounted on a frame which includes a movable cover for the inner casing and a framework attached thereto and depending therefrom. A support for the impeller driving mechanism is journaled on the bottom of this frame for rotation about the axis of the casing. The stator of an electric motor is fixed on this support. The rotor of the motor, which is concentric with the casing axis, is connected through a suitable gear train to an impeller drive shaft which is journaled in the cover for the casing and is also concentric therewith. The impeller is mounted on the impeller drive shaft above the casing cover. The housing is provided with a removable cover, which together with the casing cover just mentioned, defines the chamber in which the impeller rotates. An annular passage is formed between the housing and the casing to receive material after it has been accelerated by the impeller.

The support for the impeller driving mechanism is restrained against rotation by a torque measuring mechanism, including a lever pivoted on the frame. The rotatable support acts on this lever in one direction, and a pneumatically actuated bellows acts on the lever in the opposite direction. The pressure within the bellows is controlled by a valve located outside the housing and connected to the rotatable support through a releasable mechanical coupling.

Other objects and advantages of the invention will be apparent from a consideration of the following specification, taken together with the accompanying drawings, in which:

Fig. 2 is a cross-sectional view taken on the line II—II of Fig. 1;

Fig. 3 is a detailed view on an enlarged scale, showing the air valve mechanism;

Fig. 4 is a somewhat diagrammatic view illustrating the pneumatic system and the connections thereof to the air supply and the recording mechanism;

Fig. 5 is a vertical cross-sectional view taken on the line V—V of Fig. 2, on an enlarged scale, illustrating the dash-pot mechanism;

Fig. 6 is a fragmentary view, on an enlarged scale, taken on the line VI—VI of Fig. 2, looking in the direction of the arrows, illustrating the knife-edge pivot mechanism;

Fig. 7 is a perspective view, on an enlarged scale, of the stationary part of the knife-edge pivot;

Fig. 8 is a perspective view, on an enlarged scale, of the movable part of the knife-edge pivot.

Figure 1:
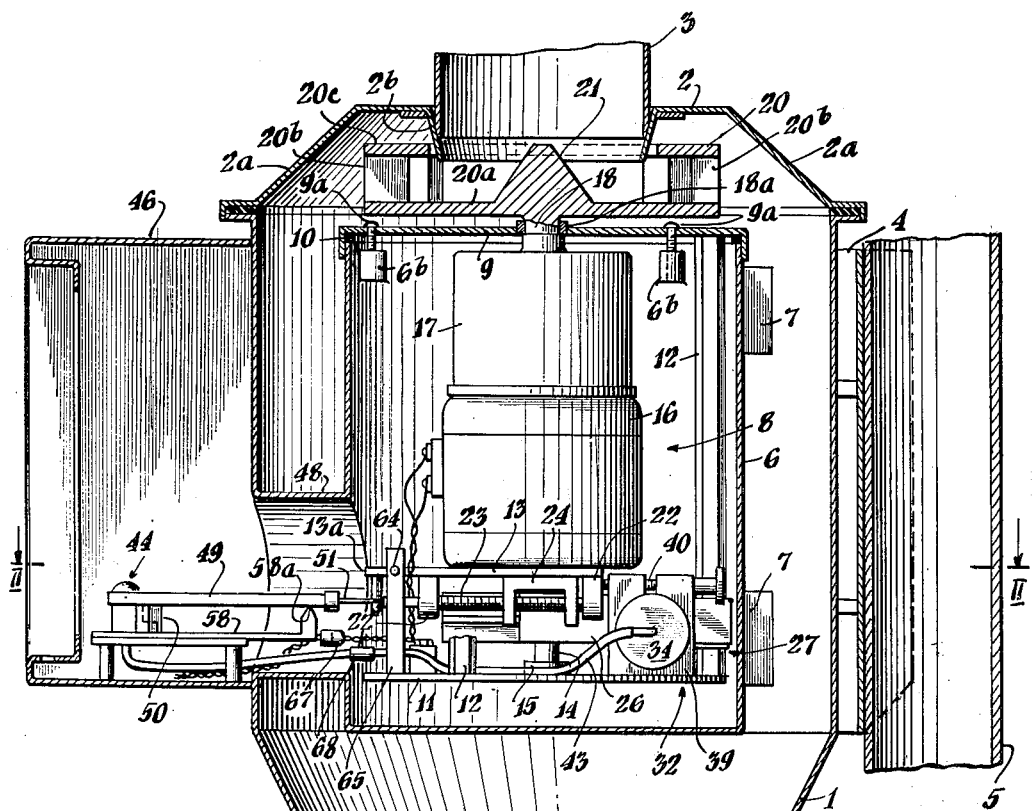
Figure 1 is a vertical cross-sectional view of flow measuring apparatus embodying the invention.

Referring to the drawings, there is shown in Fig. 1 an outer housing 1 having a removable cover 2. The housing 1 and cover 2 form a generally cylindrical structure adapted for insertion in a vertically extending conduit 3, in which the fluent material to be measured is moving downwardly. Any suitable form of pipe coupling may be provided at the center of the cover 2 and at the center of the bottom of the housing 1 to facilitate insertion of the housing in the conduit 3. The housing 1 is provided on one side with a bracket 4, by means of which it may be attached to a fixed supporting structure, such as a pipe mount 5. In this manner, the weight of the apparatus in the housing 1 is carried by the pipe mount 5, rather than by the conduit 3, which in many instances may not be constructed to carry such a load.

A cylindrical casing 6 is attached to the inside of the housing 1 by means of suitable brackets 7. The casing 6 and the housing 1 are concentric with the axis of the conduit 3.

The casing 6 is open at its upper end. Within the casing 6 is mounted an assembly generally indicated by the reference numeral 8. This assembly 8 includes a cover 9 for closing the upper end of the casing 6. A suitable gasket 10 is provided, so that the closure of the casing is substantially air tight. The assembly 8 also includes a base plate 11, which is connected to the cover 9 by means of a number of peripherally spaced posts 12. A supporting plate 13 is fixed on a shaft 14 which is journaled in the base plate 11 by means of a combined thrust and radial bearing 15. A motor 16 has its stator fixed on the supporting plate 13. The rotor of the motor 16 is concentric with the casing 6 and is connected through a gear train shown diagrammatically at 17 to an impeller shaft 18, which is journaled in a suitable sealing bearing 18a in the center of the cover 9.

Above the cover 9, there is fixed on the shaft 18 an impeller 20. Although other forms of impeller may be used, the particular form illustrated is preferred. It includes a flat plate 20a and a number of peripherally spaced upright impeller vanes 20b. The upper ends of the plates 20b are connected by a ring 20c.

The cover 2 is provided at its center with a downwardly extending generally conical flange 2b, which receives the lower end of the pipe 3, and extends downwardly to a point below the ring 20c on the impeller 20. The flange 2b is effective to guide the entering granular material into the impeller 20.

A substantial clearance space is provided between the inner edge of the ring 20c and the outside of flange 2b, and also between the upper surface of ring 20c and the lower surface of cover 2. This clearance space is necessary in apparatus for measuring the mass flow of granular material and slurries containing such material. If a close-fitting seal were provided, particles of the material might lodge in the seal, and apply a friction load on the impeller, thereby increasing the torque load on the motor, and producing a false reading of the mass flow measuring apparatus.

At the center of the impeller there is formed a vertically extending generally conical projection 21. The purpose of this projection is to receive granular material which may impinge thereon in its downward movement through the pipe 3 and guide it radially outwardly to a point on the impeller where the centrifugal force is sufficient to insure the further movement of the material in a radially outward direction. Such an arrangement is particularly necessary in cases where the fluent material is of a perishable nature, for example, flour. If the conical projection 21 were not provided, some of the flour might stick to the center of the propeller, where it would in time deteriorate and contaminate flour passed through the apparatus at a later date. The cover 9 is fastened by means of screws 9a to lugs 6b attached to the inside of casing 6 and vertically aligned with the brackets 7. The entire weight of the assembly 8 is carried by the cover 9, the wall of casing 6 and the brackets 7.

The supporting plate 13 is restrained against rotation by the force or torque measuring mechanism best seen in Fig. 2. It may be there be seen that the plate 13 carries a pair of downwardly depending lugs 22 in which a long lead screw 23 is threadedly received. A carriage 24 rides along the lead screw 23 and supports a bearing roller 25. A lever 26 is pivotally supported on one of the posts 12 by means of a knife-edge pivot mechanism generally indicated by the reference numeral 27 and described more fully below. The lever 26 extends generally diametrically from the pivot 27 across the casing 6 and carries adjacent it end a wear plate 28 which faces and is engaged by the bearing roller 25. A spring 29 is stretched in tension between an adjustable support screw 30 mounted on the base plate 11 and a lug 31, which is fixed to and depends downwardly from the supporting plate 13. The spring 39 biases the supporting plate 13 for rotation in a counterclockwise direction, as viewed in Fig. 2, about the shaft 14, and is thereby effective to hold the bearing roller 25 in contact with the wear plate 28.

An expansible chamber, generally indicated by the reference numeral 32, is mounted on the base plate 11. The chamber 32 includes an outer rigid cylinder 33, closed at one end by a plate 34, which projects radially outwardly beyond the cylinder 33 to provide a peripheral flange. The opposite end of the cylinder 33 is closed in part by an annular plate 35 and by a flexible bellows 36 having one end attached to the inner edge of the annular plate 35 and extending within the cylinder 33. The inner end of bellows 36 is closed by a disk 37 having formed at its center a crater-shaped seat 38.

A bracket 39 is fixed on the base plate 11 and supports and determines the position of cylinder 33. The bracket 39 has two spaced upstanding arms and a knurled-head fastening screw 40, which is journaled in the upstanding arm nearest its head and threaded in the other one. Tightening of the screw 40 presses the arms together so as to clamp the cylinder 33 between them and hold it firmly. In assembling the chamber 32, the cylinder 33 only has to be inserted through the arms of bracket 39 until the flange at its end engages the bracket, whereupon the tightening of the screw 40 then fixes the chamber 32 accurately in position.

The lever 26 is provided with a crater-shaped seat 41, at a point substantially aligned with the crater-shaped seat 38. The seat 41 extends completely through the lever 26 and has its apex in a hardened steel wear plate 42 fastened, as by welding, to the opposite side of the lever 26. A link 43 has hardened conically tapered ends which are received in the crater-shaped seats 38 and 41.

Figure 9:
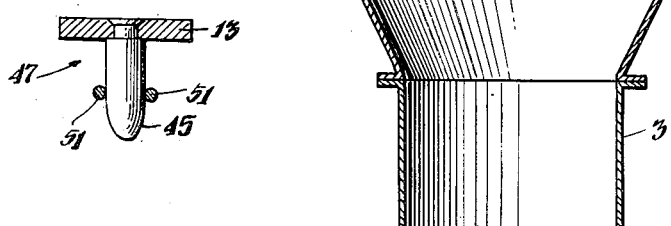
Fig. 9 is a sectional view, taken on the line IX—IX of Fig. 2, on an enlarged scale, illustrating a releasable mechanical connection.

It may be seen that the pressure of fluid in the chamber 32 tends to contract the bellows 36 and move the link 43 upwardly as viewed in Fig. 2, thereby moving the lever 26 clockwise about its pivot 27 and opposing the tendencies of the bearing roller 25 and the spring 29 to move the lever 26 counterclockwise. Fluid under pressure is supplied to the chamber 32 through a suitable conduit 43. The pressure in conduit 43 and chamber 42 is controlled by means of an air valve generally indicated at 44. The opening of the valve 44 is controlled in accordance with the angular position of the supporting plate 13 by means of a releasable mechanical coupling 47 including a pin 45 which projects downwardly from the supporting plate 13. The valve 44 is located outside the housing 1 in a control box 46 which may have a suitable cover (not shown). The control box 46 is mounted on the outside of the housing 1 and communicates with the interior of casing 6 by means of a radially extending passage 48. The valve 44 is operated by the means of a lever 49 pivoted on a suitable bearing 50 and having an arm extending through the passage 48 toward the casing 6. On its inner end this arm of the lever 49 carries a pair of thin spring fingers 51. The fingers 51 form part of the coupling 47 and have a normal spacing at the point where they engage the pin 45 which is less than the diameter of the pin 45 at that point. The lower end of the pin 45 is tapered or rounded (see Fig. 9) so that it slides easily between the fingers 51 during the assembly of the apparatus.

The air valve 44 (see Fig. 3) comprises an arm 49a of the lever 49. A nozzle 52 has its tip closely adjacent the arm 49a. A spring flap 53 is attached by suitable means to the arm 49a near the end thereof farthest from the pivot 50 and extends along the arm 49a toward that pivot. The flap 53 is on the side of the arm 49a nearest the nozzle 52, and is self biased away from the arm 49a, so that it engages the tip of nozzle 52.

Valves of this type which are effective to throttle the flow of air through a nozzle, so as to regulate the air pressure inside the nozzle, are very sensitive. They produce a large, readily measurable change of air pressure inside the nozzle upon a very small movement of the valve, as long as the movable valve member is very close to the nozzle. As soon as the valve member moves a short distance away from the nozzle, this sensitivity is lost. The valves of the prior art have been applicable only in situations where the range of movement of the movable member is very small. Such a small range of movement necessitates the use of very fine adjustments in setting the ends of the range. The use of the flap 53 provides an opening of the valve proportional to the movement of the lever 49, but very much smaller than the opening which would be provided by the travel of the lever arm 49a with respect to nozzle 52. Consequently, the sensitivity of the valve can be maintained over a much wider range of movement of the lever 49 than would be the case if the flap 53 were not employed.

Since the range of movement of the valve must be small, it is necessary, where the valve is operated by a lever, to place the valve close to the fulcrum or pivot. In prior art devices, the pivot must be located with great precision, and the spacing between the pivot and valve must also be determined precisely. The use of flap 53 reduces substantially these precision requirements, and permits a greater separation between the fulcrum and the valve, so that the adjustments are much less critical.

The pivot bearing 50 is fixed on a plate 58 which is suitably attached to the bottom of the control box 46. The nozzle 52 is fixed in a block 52a which is also mounted on plate 58. The plate 58 has an elongated extension under the long arm of lever 49, terminating in an upstanding ridge 58a. The end of lever 49 rides on ridge 58a and is partially supported thereby. The provision of the ridge 58a eliminates a torque load on the pivot bearing 50 due to the weight of lever 49, and reduces the friction at that bearing.

It has been found that when measuring the mass rate of flow of granular material by the present method, the material may have a tendency to agglomerate in clusters considerably larger than the grain size of the material being measured. This agglomeration may take place in the conduit 3, ahead of the flow measuring apparatus, or it may occur as the material impinges on the impeller 20. In any event, it produces an unevenness in the flow of material which results in an uneven torque load on the motor 16, and a tendency of the supporting plate 13 to oscillate, with resulting undesirable minor variations in the recording mechanism.

This oscillating tendency may be readily overcome by means of a dash-pot 54, shown in detail in Fig. 5. As there shown, the dash-pot consists of a piston 55 moving in a cylinder 56. The cylinder may be filled with oil. This piston 55 is provided with an aperture 57 connecting its ends. The piston 55 moves tangentially with respect to the axis of the shaft 14 and is driven by a pin 59 fixed on the supporting plate 13 and projecting down through the cylinder 56 into a suitable aperture in the piston 55. Other forms of dash-pot may be used with equal facility.

The details of the knife-edge bearing 27 are best shown in Figs. 6 to 8. The bearing includes a stationary block 60, mounted on the post 12 and a movable bearing member 61 fixed on the lever 26. The block 60 is provided with upper and lower spaced projections 60a and 60b, which extend toward the bearing member 61. A wear plate 62 is fastened as by welding to the underside of the block 60. The wear plate 62 does not conform to the shape of the under surface of the lower projection 60b, but extends out underneath the projection 60a (see Fig. 7). The right hand side of the projection 60a as viewed in Fig. 6, forms an open dihedral angle of substantially 90° with the adjacent plane surface of the block 60. Similarly, the left hand side of the projection 60b forms an open dihedral angle of subtsantially 90° with the same plane surface of the block 60. These two dihedral angles have their vertices vertically aligned.

The bearing member 61 is provided with upper and lower projections 61a and 61b. These projections extend toward the block 60, when the bearing is assembled. The projections 61a and 61b are machined at their outer ends to form the aligned vertices of a pair of solid dihedral angles of substantially less than 90°. These two solid dihedral angles on the projections 61a and 61b are vertically aligned and adapted to fit in the open dihedral angles formed on the block 60 and described above. The lower part of the block 60 is formed with a projection 61c which terminates in a point. This point rides on the wear plate 62 when the bearing is assembled.

The center of gravity of the lever arm 26 is spaced from the pivot 27. The weight of arm 26 is supported solely by the projecting point 61c resting on the wear plate 62. The lever arm 26 is, therefore, subject to a force couple tending to swing its outer end downward. This couple is resisted by the knife-edge bearing construction described, since the upper projection 61a engages the outer side of the bearing block projection 60a, and the lower projection 61b engages the inner side of the bearing block projection 60b. The bearing structure thereby provides a reactive couple opposing the force couple previously described and maintaining the lever 26 in a horizontal plane, even though it is supported at one point.

It may be observed that the movements of the lever 26 are substantially without frictional resistance, since the only contacts with it are point or line contacts, namely, at the bearing 27, link 43 and the bearing member 25. There is no surface contact, and hence friction is held to a minimum.

The range of swinging movement of the supporting plate 11 is limited by a pair of stop bolts 63 and 64, which are threaded into posts 65 fixed on the base plate 11. One of the posts 65 also carries a bracket 66 which supports the screw 30 by which the tension of spring 29 is adjusted.

The stop screws 63 and 64 lie in the path of a projection 13a on the supporting plate 13.

It may be seen that all the adjustments including the stop screws 63 and 64, the spring tension adjusting screw 30, and the bearing position adjusting screw 23 are accessible through the control box 46. When the cover of the control box 46 is open, these adjustments can be reached through the passage 48, since they are on the side of the motor assembly which is closest to that passage.

In assembling the apparatus disclosed herein, first the parts to be fixed to the plate 13 are attached to that plate. The motor 16, reduction gear 17, shaft 18, cover 9 and impeller 20 are then assembled on the supporting plate 13 and the shaft 14 is attached to the plate. The framework consisting of the posts 12 and the base plate 11 is then attached to the cover 9, with the lower end of shaft 14 received in bearing 15. The bearing block 60 is then attached to its post 12 and the expansible chamber 32 is mounted in the bracket 39 as previously disclosed. Parts to be mounted on the base plate are then attached, including the posts 65, bracket 66 and spring adjusting screw 30. The spring 29 may then be connected between the lug 31m, the supporting plate 13 and the adjusting screw 30.

The lever 26 may now be assembled on its pivot by slipping it in place, after which the link 43 may be inserted by holding the lever 26 away from the chamber 32 far enough to provide the space required for assembly. The entire unit so far described may then be inserted within the casing 6, and fastened down by screws 9a. The valve operating mechanism, including the lever 49 and its associated parts, is assembled in the control box before the motor assembly is placed in the casing 6. While placing the motor assembly in casing 6, the pin 45 is aligned with the fingers 51, so that it slips between them and completes the mechanical coupling of the supporting plate 13 with the valve 44. An electrical power supply connection to motor 16 is then completed through a releasable electrical connector 67 located in passage 48. A suitable releasable pneumatic coupling 68 is connected in conduit 43 and located in the passage 48. As soon as coupling 68 is engaged, the apparatus is completely assembled. After the necessary calibrating adjustments have been made, it is ready to operate.

Fig. 4 illustrates a pneumatic recording system including the apparatus described above. In Fig. 4, compressed air comes from a supply schematically indicated at 69 and flows through a fixed restriction 70 to a conduit 71. The conduit 71 is connected to the nozzle 52 and also to a pneumatic pressure recorder 72, which may be of any suitable commercial type. The conduit 71 is also connected through the conduit 43 to the expansible chamber 32.

*Operation*

With the parts assembled as shown in the drawings and described above, any fluent material entering through the conduit 3 impinges on the rotating impeller 20 and is accelerated thereby toward the periphery of the housing 1. It strikes a downwardly sloping portion 2a of the cover 2 and then passes through the annular conduit defined by the housing 1 and casing 6 and out through the lower section of the conduit 3. As it is accelerated by the impeller 20, the fluent material imposes a torque load on the impeller, which is proportional of the mass rate of the flow of the fluent material. This torque load is transmitted to the motor 16, where it applies a proportional torque load to the stator, which is rotatably mounted for movement as a unit with the supporting plate 13. The supporting plate 13 tends to be rotated by this torque counterclockwise about shaft 25, as viewed in Fig. 2. The bearing member 25 and the lever 26 are thereby also moved counterclockwise. This movement of supporting plate 13 is transmitted through the mechanical coupling 47, to the lever 49 and operates the valve 44 in a closing direction. This increases the pressure in the conduit 71, and the increased pressure is transmitted both to the pressure recorder 72 and to the chamber 32 where it acts to expand the chamber and contract the bellows 36, thereby applying through the link 33 and lever 26 a torque acting in a clockwise direction and opposing the counterclockwise torque imposed on the lever 26 by the bearing member 25. The motion of supporting plate 13 continues until the pressure in chamber 32 is increased sufficiently, so that the torques acting on the lever 26 are balanced. As long as these torques are balanced, the lever 26 remains stationary. If the torques become unbalanced, due to a change in the torque load on the impeller 20, the supporting plate 13 moves in the proper direction to operate valve 44 in a sense to change the pressure in chamber 32 and restore the balanced condition. It may, therefore, be seen that the pressure in chamber 32 is a measure of the torque load on the impeller 20 and is hence of the mass rate of the flow of material past the impeller. The pressure in chamber 32 is recorded on the recorder 72, which may be readily calibrated in terms of the mass rate of flow past the impeller.

Commercial pneumatic recorders, such as that indicated diagrammatically at 72 are commonly constructed to register zero when the pressure supplied to them is 3 p. s. i. or lower, and to register their full scale measurement when the pressure is 15 p. s. i. The spring 29 is provided so that it may be adjusted to insure that the recorder 72 reads zero when no material is passing through the impeller. The recorder 69 is calibrated by starting the motor 16 with no material flowing through the apparatus, adjusting the screw 30 until the recorder indicates some positive value and then reducing the tension in the spring 29 by means of screw 30 until the recorder 69 reads exactly zero.

The motor 16 should theoretically be a constant speed motor, in order that the torque may be properly taken as a measure of the force required to accelerate the flowing material. It has been found that satisfactory results can be obtained with an induction motor provided its slip at full load does not exceed 5%. For example, very satisfactory results have been obtained with a motor having a slip at rated load of approximately 4%. If a motor having a rating somewhat greater than the largest expected load is used, the error is further reduced. Furthermore, the percentage error due to the slip in the driving motor increases with the load, whereas other errors in the system tend to be greater at light loads. The result is that the overall percentage error in the complete apparatus is fairly constant throughout the range of loads for which the apparatus is designed and can be readily minimized to a satisfactory degree by proper calibration. Consequently, it is possible to use an induction motor instead of the more expensive synchronous type even though the speed of the induction motor does vary somewhat with load.

The presence of the clearance space previously described permits the impeller to pump air continually. The air circulates radially out through the impeller and back through the clearance space. This air pumping action introduces a small error into the torque measurement, which error may be completely corrected at no load by means of the zero adjustment described above. This error may also be completely corrected at full load by means of the lead screw 23, which determines the mechanical advantage of the motor torque over the torque applied by expansible chamber 32. It has been found safe to assume that if this error is completely corrected at no load and full load, it may be disregarded at all intermediate loads.

Furthermore, in order that the measurement may not be made inaccurate by the passage of any substantial portion of the material being measured through this clearance space, it is necessary that the impeller run only partially filled with the material, the remainder of the space in the impeller being occupied by air or another gas of low density as compared to the density of the material whose flow is being measured.

Since the casing cannot run full, the apparatus must be run with its axis vertical, in order to ensure that all particles of the fluent material are accelerated equally by the impeller. If the axis were horizontal, for example, the material which passed downwardly out of the impeller would be accelerated by gravity, while the material passing upwardly would be decelerated by gravity. An even distribution of the material could not be safely assumed. In fact, no definite distribution of the incoming material among the available radial directions could be safely assumed for all operating conditions. Consequently, the torque load on the motor would be disturbed by gravity in an uncertain manner, with resulting errors in the mass flow measurement. Furthermore, if the apparatus were run with its axis in any position other than vertical, it might be subject to an additional possible error due to the passage of a substantial portion of the material being measured through the clearance space.

As indicated above, the apparatus as disclosed is not suitable for the measurement of the mass flow of gaseous material. If used for gas, or for liquid with the casing running full, the impeller must, of course, be sealed to the inlet so that all the fluid being measured will flow through the impeller.

While I have shown and described a preferred embodiment of my present invention, other embodiments may occur to those in the art and I, therefore, intend my invention to be limited by the appended claims.

I claim:

1. Apparatus for measuring the mass rate of flow of fluent material, comprising means defining a chamber, fluent material conveying means having an outlet opening downwardly into said chamber, an impeller mounted in said chamber for rotation about a vertical axis aligned with said outlet to receive material discharged therefrom and to impel it centrifugally toward the periphery of the chamber, a generally cylindrical casing closed at the top and located below and in alignment with said impeller, an outer cylindrical wall concentric with said casing and cooperating therewith to define an annular receiving conduit having its upper end in communication with said chamber adjacent its periphery, said annular conduit extending downwardly from the chamber for conveying material therefrom, a support mounted in said casing for pivotal movement about a vertical axis, a motor including a stator and a rotor, means fixing said stator to said support, means drivingly connecting the impeller to the rotor, and means restraining the movement of said support, including means measuring the force required to restrain the support, said force being a measure of the torque load on said rotor and hence of the mass of material impelled by said impeller per unit time.

2. Apparatus for measuring the mass rate of flow of fluent material, as defined in claim 1, in which the rotor is rotatable about the axis of the casing.

3. Apparatus for measuring the mass rate of flow of fluent material, as defined in claim 1, including a unit removable from said apparatus and comprising said support, said motor, said impeller, said connecting means, a base plate receivable in the bottom of said casing, a cover for said casing and forming a bottom wall for said chamber, and a plurality of columns connecting said base plate and cover, said support being pivotally mounted on said base plate, and said connecting means including a shaft journaled in said cover.

4. Apparatus for measuring the mass rate of flow of fluent material, as defined in claim 1, including means defining a passage extending radially from said casing outwardly across said annular conduit, power supply coupling means extending through said passage and operatively connected to said motor, said force measuring means including quantity exhibiting means outside said annular conduit, and quantity transmitting means operatively connecting said exhibiting means and said measuring means and extending through said passage.

5. Apparatus for measuring the mass rate of flow of fluent material, as defined in claim 1, comprising a stationary frame in said casing on which said support is journaled, and in which said pivotal movement restraining means comprises a lever pivoted on said frame for rotation about an axis spaced from and parallel to said support axis, a bearing mounted on said support and radially spaced from said support axis, said lever including a portion aligned with said bearing, said motor being effective upon rotation thereof to turn said support in a direction to hold said bearing in engagement with said lever portion, spring means biasing said support in the same direction, means mounted on said frame and defining an expansible chamber having a wall movable in response to fluid pressure variations therein, means operatively connecting said wall to said lever to act thereon in opposition to said spring means and said support, and means controlling the fluid pressure in said expansible chamber including valve means operatively connected to said support and effective upon movement of the support in a direction indicative of increased load on the motor to vary the fluid pressure in said expansible chamber in a sense to oppose the movement of the support.

6. Apparatus for measuring the mass rate of flow of fluent material, comprising an inner, generally cylindrical, vertical casing, closed at its lower end, a removable cover adapted to fit tightly the top of said casing; a frame including said cover, a base insertable in said casing, and a plurality of columns connecting the base and the cover; a support mounted on said base for rotation about the axis of the casing, an electric motor having a stator fixed on said support and a rotor rotatable about the casing axis, said motor being effective upon rotation of said rotor to apply to said support a torque indicative of the load on the motor, a shaft journaled in said cover at the center thereof and operatively connected to the rotor, an impeller for said fluent material fixed on the shaft outside the cover, fluid pressure responsive variable torque applying means mounted on the frame and operatively connected to the support to apply thereto a variable torque opposing the torque acting thereon due to rotation of the motor rotor, said applied torque varying in accordance with the pressure of a fluid supplied to said torque applying means, said frame, support, motor shaft, cover, impeller and torque applying means constituting an assembly removable as a unit from said casing; an outer cylindrical casing cooperating with said inner casing to define a conduit of annular cross-section, an outer cover attachable at its periphery to said outer casing and defining with said removable cover a chamber of generally circular cross-section enclosing said impeller, said outer cover having a central aperture aligned with said impeller and adapted to admit said fluent material to impinge on said impeller and to be accelerated horizontally thereby, so as to load said impeller and thereby said motor with a torque indicative of the mass rate of flow of fluent material past said impeller, said annular conduit forming an outlet for said material; means forming a substantially radial passage extending across said annular conduit and communicating with the interior of said inner casing; means including a valve outside said inner casing to control the pressure of a body of fluid, mechanical coupling means operatively connected to said valve and extending through said passage and connected to said support when said assembly is in place within said inner casing, said coupling means operating said valve to control said pressure in accordance with the deviation of the support from a normal position, fluid coupling means extending through said passage and operatively connecting said body of fluid and said torque applying means, said valve being effective to control the torque applied by said applying means in a sense to restore said support toward said normal position; means for translating the pressure of said body of fluid into a scalar quantity indicative of the mass rate of flow of fluent material through said impeller; and electrical coupling means extending through said passage to supply electric current to said motor, all said coupling means being releasable to permit removal of said assembly.

7. Apparatus for measuring the mass rate of flow of fluent material, as defined in claim 6, in which said mechanical coupling means comprises a lever operatively connected to said valve and having an arm projecting inside said inner casing, a pair of flexible fingers on the end of said arm, a lug on said support and projecting downwardly therefrom, and terminating in an end portion of decreasing diameter insertable between said fingers, said fingers being self-biased to engage the sides of the lug yieldably so that the lever and the lug move concurrently without lost motion.

8. Apparatus for measuring the mass rate of flow of fluent material, as defined in claim 7, in which said fluid is air, and said valve comprises a nozzle directed at right angles to said lever, and a leaf spring attached at one of its ends to said lever and overlying the end of the nozzle, said leaf spring being self-biased to engage yieldably the end of the nozzle.

9. In apparatus for measuring the mass rate of flow of fluent material, in combination, a generally cylindrical, vertical casing, closed at its lower end, a removable cover adapted to fit tightly the top of said casing; a frame including said cover, a base insertable in said casing, and a plurality of columns connecting the base and the cover; a support mounted on said base for pivotal movement about the axis of the casing, a motor having a stator fixed on said support and a rotor rotatable about the casing axis, said motor being effective upon rotation of said rotor to apply to said support a torque indicative of the load on the motor, a shaft journaled in said cover at the center thereof and operatively connected to the rotor, an impeller for said fluent material fixed on the shaft outside the cover, means for directing said fluent material downwardly into the central portion of said impeller, means to convey said material away from the periphery of said impeller, means mounted on the frame and operatively connected to the support to restrain rotation thereof upon rotation of the motor rotor, and means for measuring the force applied to the support by said rotation restraining means, said force being a measure of the mass rate of flow of fluent material past said impeller.

10. Apparatus for measuring the mass rate of flow of fluent material, as defined in claim 9, in which: said support comprises a plate parallel to and spaced from said base, and a post journaled on the base and supporting the plate; said rotation restraining means comprises a lever, knife-edge pivot means mounted on the frame below the plate, and supporting the lever for angular movement about a vertical axis, a bearing member adjustably mounted on the under side of the plate and engaging said lever to transmit force thereto, a spring connected between said plate and said frame and biasing the plate in a direction to hold the bearing member in contact with the lever, pneumatic motor means opposing angular movement of said lever by said plate and said spring, said motor means comprising an outer rigid cylinder closed at one end and having a flange at said closed end, a bracket fixed on said base and having a pair of yieldable, spaced, upstanding arms defining between them an aperture to receive said cylinder, means for clamping said arms against said cylinder to hold it in a position fixed by the bracket arms and the flange, with the open end of the cylinder facing the lever, an expansible bellows within and concentric with said cylinder and having its outer end connected to the open end of the cylinder by a rigid wall and its inner end closed by a second rigid wall, said bellows and cylinder cooperating to define a closed, expansible chamber, said second rigid wall at the inner end of the bellows having a crater formed therein, the lever opposite said bellows having another crater formed therein, a rigid link formed at both ends with cones to cooperate with said craters said link being received between the lever and said second rigid wall, means connected to the interior of said chamber to supply thereto a fluid under pressure, and means responsive to the angular position of the support to control the pressure of said fluid to balance the force applied to the lever by the plate and spring; and said force measuring means comprises means to measure the pressure of the fluid supplied to the chamber.

11. Apparatus for measuring the mass rate of flow of fluent material, as definied in claim 9, in which said support comprises a plate parallel to and spaced from said base, and a post journaled on the base and supporting the plate; and said rotation restraining means comprises a lever and knife-edge pivot means mounted on the frame below the plate and supporting the lever for angular movement about a vertical axis, said knife-edge pivot means comprising a knife-edged block fixed on the lever and having spaced upper and lower projections extending at right angles to said lever and terminating in dihedral angles smaller than 90° and having aligned vertical vertices, said projections being located on opposite sides of a vertical plane substantially perpendicular to the lever with the upper projection on the opposite side of the plane from the center of gravity of the lever, and a stationary bearing block fixed on the frame and formed with upper and lower recesses spaced correspondingly to said projections, said recesses having dihedral angles greater than the angles on said projections to permit substantial angular movement of said lever, said knife-edged block having a downwardly extending point at the lower side of its lower projection, and a horizontal wear plate fixed on said bearing block and extending under said point to support said lever.

References Cited in the file of this patent

UNITED STATES PATENTS

| 1,856,138 | Ruemelin | May 3, 1932 |
| 2,159,684 | Bennett | May 23, 1939 |
| 2,339,737 | Hulse | Jan. 18, 1944 |
| 2,354,923 | McNamee | Aug. 1, 1944 |
| 2,366,199 | Kunz | Jan. 2, 1945 |
| 2,474,368 | Rankenburg | June 28, 1949 |
| 2,542,769 | Griffey | Feb. 20, 1951 |
| 2,591,478 | Turner, Jr. | Apr. 1, 1952 |
| 2,596,220 | Dodds | May 13, 1952 |
| 2,602,330 | Kollsman | July 8, 1952 |
| 2,611,663 | Foster | Sept. 23, 1952 |

OTHER REFERENCES

The Constant-Air-Weight Method of Cupola Blowing, in the General Electric Review, vol. 33, pp. 684–689, No. 12, December 1930.